(12) United States Patent
Kataoka et al.

(10) Patent No.: US 11,698,353 B2
(45) Date of Patent: Jul. 11, 2023

(54) QUANTITATIVE ANALYSIS METHOD, QUANTITATIVE ANALYSIS PROGRAM, AND X-RAY FLUORESCENCE SPECTROMETER

(71) Applicant: Rigaku Corporation, Akishima (JP)

(72) Inventors: Yoshiyuki Kataoka, Otsu (JP); Yasushi Kusakabe, Ibaraki (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 17/793,913

(22) PCT Filed: Dec. 4, 2020

(86) PCT No.: PCT/JP2020/045322
§ 371 (c)(1),
(2) Date: Jul. 19, 2022

(87) PCT Pub. No.: WO2021/161631
PCT Pub. Date: Aug. 19, 2021

(65) Prior Publication Data
US 2023/0060446 A1 Mar. 2, 2023

(30) Foreign Application Priority Data
Feb. 12, 2020 (JP) .................................. 2020-021771

(51) Int. Cl.
*G01N 23/223* (2006.01)
*G01N 23/2208* (2018.01)

(52) U.S. Cl.
CPC ....... *G01N 23/223* (2013.01); *G01N 23/2208* (2013.01); *G01N 2223/076* (2013.01);
(Continued)

(58) Field of Classification Search
CPC ............. G01N 23/223; G01N 23/2208; G01N 2223/076; G01N 2223/304
See application file for complete search history.

(56) References Cited

U.S. PATENT DOCUMENTS 7,961,842 B2* 6/2011 Kawahara ............ G01N 23/223
378/45
8,582,717 B2* 11/2013 Ohzawa ............... G01N 23/223
378/45
(Continued)

FOREIGN PATENT DOCUMENTS

CN 1624463 A 6/2005
CN 101151524 A 3/2008
(Continued)

OTHER PUBLICATIONS

Office Action dated Oct. 25, 2022, for corresponding CN Patent Application No. 202080086958.0 pp. 1-6.
(Continued)

*Primary Examiner* — Bryan Bui
(74) *Attorney, Agent, or Firm* — Hea Law PLLC (57) ABSTRACT

Provided are a quantitative analysis method, a quantitative analysis program, and an X-ray fluorescence. The quantitative analysis method includes: a step of acquiring a representative composition set to represent contents of analysis components; a step of acquiring a plurality of comparative compositions, in each of which the content of one of the analysis components of the representative composition is changed by a predetermined content; a detection intensity calculation step of calculating a detection intensity indicating an intensity of fluorescent X-rays detected under the influence of the geometry effect through use of an FP method with respect to a virtual sample having a thickness set in advance and being indicated by each of the representative composition and the comparative compositions; and a step of calculating a matrix correction coefficient for each of the analysis components based on the detection intensity.

8 Claims, 7 Drawing Sheets

(52) U.S. Cl.
CPC .......... *G01N 2223/1016* (2013.01); *G01N 2223/304* (2013.01); *G01N 2223/305* (2013.01); *G01N 2223/3037* (2013.01)

(56) References Cited

U.S. PATENT DOCUMENTS

| | | | |
|---|---|---|---|
| 2005/0053193 | A1 | 3/2005 | Hasegawa |
| 2009/0041184 | A1 | 2/2009 | Kawahara et al. |

FOREIGN PATENT DOCUMENTS

| | | | |
|---|---|---|---|
| CN | 107290376 | A | 10/2017 |
| JP | H05322810 | A | 12/1993 |
| JP | H09269305 | A | 10/1997 |
| JP | H1082749 | A | 3/1998 |
| JP | 2002340823 | A | 11/2002 |
| JP | 2006292399 | A | 10/2006 |
| JP | 2011089953 | A | 5/2011 |

OTHER PUBLICATIONS

International Search Report dated Feb. 22, 2021, relating International Patent Application for PCT/JP2020/045322 with English translation, pp. 1-5.

Hisayuki Kohno, Mamoru Murata, Yoshiyuki Kataoka, and Tomoya Arai, "Automation of X-Ray Fluorescence Analysis" Advances in X-Ray Chemical Analysis, Japan, Agne Gijutsu Center Inc., vol. 19 (1988) pp. 307-328 (Cited in the specification p. 1, line 10 to p. 4, line 26).

* cited by examiner

QUANTITATIVE ANALYSIS METHOD, QUANTITATIVE ANALYSIS PROGRAM, AND X-RAY FLUORESCENCE SPECTROMETER

CROSS REFERENCE TO RELATED APPLICATIONS

This application is a National Stage of International Application No. PCT/JP2020/045322 filed on Dec. 4, 2020, which claims priority from Japanese Patent Application 2020-021771, filed on Feb. 12, 2020. The contents of the above document is incorporated herein by reference in its entirety.

TECHNICAL FIELD

The present invention relates to a quantitative analysis method, a quantitative analysis program, and an X-ray fluorescence spectrometer.

BACKGROUND ART

There is an X-ray fluorescence analysis method of irradiating a sample with primary X-rays to quantitatively analyze contents of components (elements and compounds) contained in the sample based on detected X-ray intensities of secondary X-rays emitted from the sample. The secondary X-rays include: fluorescent X-rays generated from each component in the sample irradiated with the primary X-rays; and scattered rays of the primary X-rays. A wavelength of the fluorescent X-rays has a value intrinsic to each element, and hence a quantitative analysis of a component contained in the sample is performed based on a fluorescent X-ray intensity of a specific wavelength.

There is a phenomenon that fluorescent X-rays generated from a certain component in a sample are absorbed by a coexisting component present around the component before the fluorescent X-rays exit through the path to a front analyzing surface of the sample. There is also a phenomenon (secondary excitation) that an element of the component is secondarily excited by the fluorescent X-rays generated from the coexisting component to generate fluorescent X-rays. Due to those phenomena, even when the content of the certain component contained in the sample is constant, an intensity of the fluorescent X-rays generated from the certain component differs depending on the type and content of the coexisting component (matrix effect). Accordingly, in order to improve accuracy of the quantitative analysis, it is required to correct an influence of the matrix effect.

As a method of performing the correction, there is a method including a matrix correction term in a calibration curve equation and using a matrix correction coefficient in the matrix correction term. In regard to this matrix correction coefficient, a fundamental parameter method (the FP method) is used for a representative composition to be analyzed (hereinafter referred to as "representative composition") as well as a plurality of compositions (hereinafter referred to as "comparative compositions"), in each of which a content of each of analysis components contained in the representative composition is changed by a predetermined content, to thereby calculate theoretical intensities of fluorescent X-rays of the analysis components. The matrix correction coefficient is calculated by comparing the theoretical intensities to each other (see NPL 1).

When a sample to be analyzed is steel containing large amounts of Ni, Fe, and other elements, an analysis depth is usually up to about 20 µm. In this case, only a region near the front surface of the sample is an analysis region. Meanwhile, when the sample to be analyzed is, for example, oil formed of carbon, oxygen, hydrogen, and other components having small atomic numbers, primary X-rays penetrate deeply into the sample. For example, when a content of Sn in oil is analyzed by measuring a high-energy Sn Kα line, fluorescent X-rays generated from a depth of 3 cm or more from the front surface of the sample are also emitted to the outside of the sample. When high-energy fluorescent X-rays emitted from a sample containing such light components as main components are measured, there can be area where the generated fluorescent X-rays are not detected, depending on a position at which fluorescent X-rays are generated inside the sample. That is, a non-detection region 704 in which the generated fluorescent X-rays are not detected is present in the sample (see FIG. 7). This phenomenon is called "geometry effect" (see PTL 2). The geometry effect is particularly noticeable when high-energy fluorescent X-rays are measured.

Figure 7:
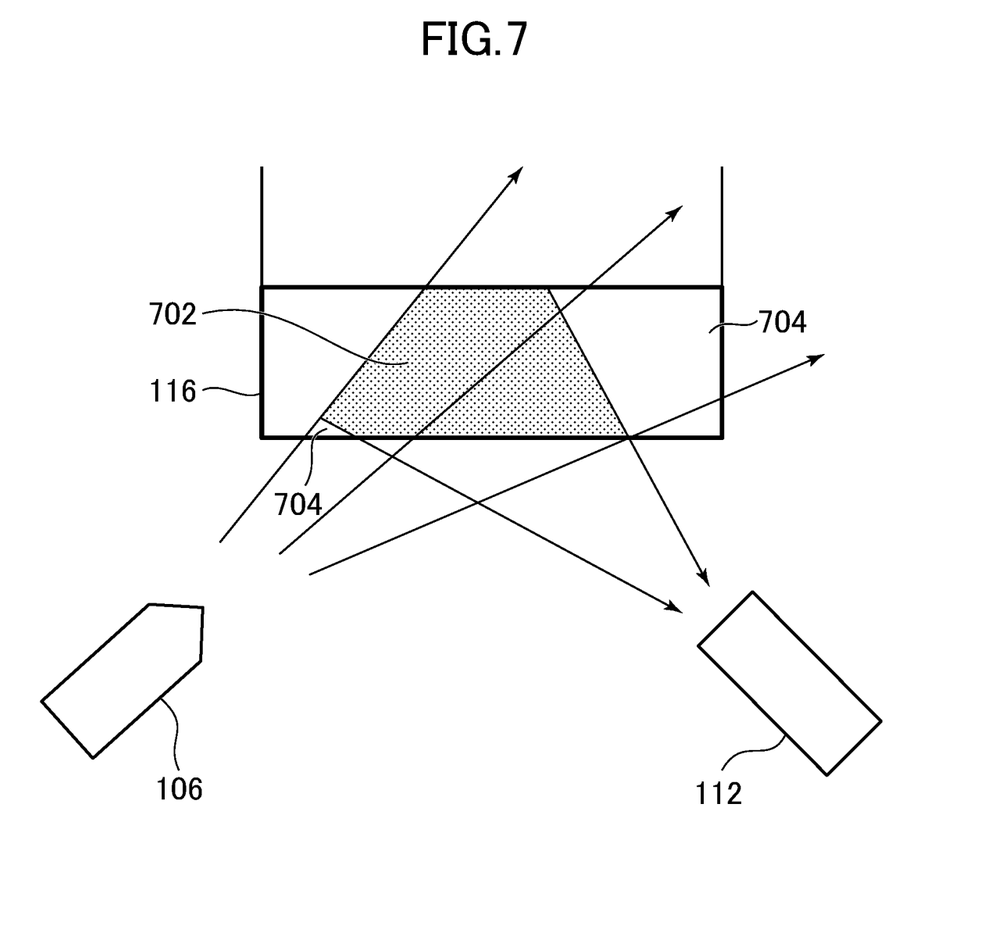
FIG. 7 is a diagram illustrating a basic idea of a geometry effect.

FIG. 7 is a diagram for illustrating the geometry effect. When fluorescent X-rays to be measured have high energy and the main components of the sample are light elements, primary X-rays penetrate into a deep position of the sample. As illustrated in FIG. 7, there are a detection region 702 in which fluorescent X-rays generated inside the sample by the primary X-rays generated from an X-ray source are detected, and the non-detection region 704 in which the fluorescent X-rays are not detected. The geometry effect is highly dependent on an optical system of an apparatus. In addition, a region in which the fluorescent X-rays emitted from the front surface of the sample are detected by a detector and a region in which the fluorescent X-rays are not detected are present depending on the position at which fluorescent X-rays are generated. The influence of the geometry effect depends on optical system conditions of the apparatus. For example, a region of the front surface of the sample irradiated with primary X-rays, an angle (incident angle) between the primary X-rays and the front surface of the sample, a region of the front surface of the sample in which the fluorescent X-rays are detected, and a detection angle, are determined by the optical system conditions.

As described above, in order to accurately theoretically calculate the X-ray intensity of the detected fluorescent X-rays through use of the FP method, it is required to take the influence of the geometry effect into consideration. There are a theoretical intensity calculation and a quantitative analysis methods that take the geometry effect into consideration by performing a simulation calculation (Monte Carlo simulation) of X-ray trajectory through use of randomly determined values (see PTL 2).

CITATION LIST

Patent Literature

[PTL 1] JP 05-322810 A
[PTL 2] JP 2006-292399 A

Non Patent Literature

[NPL 1] Hisayuki Kohno, Mamoru Murata, Yoshiyuki Kataoka, and Tomoya Arai, "Advances in X-Ray Chemical Analysis, Japan" AGNE Gijutsu Center Inc., Vol. 19 (1988) pp. 307-328

SUMMARY OF INVENTION

Technical Problem

To perform a quantitative analysis through use of a calibration curve method, first, a sample is irradiated with primary X-rays and an intensity of emitted fluorescent X-rays is measured. Then, the intensity of the fluorescent X-rays obtained through the measurement and a calibration curve equation expressed by Math. 1 are used to obtain a quantitative value of a component to be analyzed.

$W_i$ is a value representing a mass fraction (mass %) of an analysis component "i", and "a", "b", and "c" are constants. A detection intensity $I_i$ is a value representing a measurement intensity of the analysis component "i", and $\alpha_j$ is a value representing a matrix correction coefficient for a coexisting component "j" of the analysis component "i". $W_j$ is a value representing a mass fraction (mass %) of the coexisting component "j". In this case, the matrix correction coefficient $\alpha_j$ is calculated by performing a theoretical intensity calculation for a representative composition and a plurality of comparative compositions through use of an FP method.

$$W_i = (bI_i + c)(1 + \Sigma \alpha_j W_j) \quad \text{[Math. 1]}$$

In place of the calibration curve equation of Math. 1, Math. 2 or Math. 3 may be used.

$$W_i = (aI_i^2 + bI_i + c)(1 + \Sigma \alpha_j W_j) \quad \text{[Math. 2]}$$

$$W_i = bI_i(1 + \Sigma \alpha_j W_j) + c \quad \text{[Math. 3]}$$

Math. 1 and Math. 3 are both calibration curve equations of straight line, and handle intercept in different manners. Math. 2 is a calibration curve equation of a curved line, and is used when a range of concentration of the analysis component is wide. When the constant "a" of Math. 2 is 0, Math. 2 is identical to Math. 1. In addition, when a net intensity with a background removed is used as the measurement intensity, the intercept "c" of Math. 1 and Math. 3 may be set to 0.

In PTL 1, a calibration curve equation in which the influence of a matrix effect is corrected is derived from a simple theoretical intensity equation, and a theoretical basis of the calibration curve equation including a matrix correction term is disclosed. In PTL 1, there is also disclosed a simple theoretical intensity equation for a case in which a sample to be measured is a fused bead. Assuming that a reference dilution ratio is 0 in PTL 1, a simple theoretical intensity equation for a bulk model sample (infinite thickness sample such as metal sample) that is not diluted with, for example, a flux for a fused bead is obtained. A simple theoretical intensity equation for fluorescent X-rays of the bulk model sample is expressed by Math. 4.

$$I_{Ti} = K_i W_i \rho \int_0^\infty e^{-(\Sigma \mu_j W_j)\rho x} dx = \frac{K_i W_i}{\Sigma \mu_j W_j} \quad \text{[Math. 4]}$$

$I_{Ti}$ represents a theoretical intensity of the analysis component "i". $K_i$ represents a constant. $W_i$ represents the mass fraction of the analysis component "i", $\rho$ represents a density of the sample, and $\mu_j$ represents an overall absorption coefficient for a component "j" in the sample with respect to analysis lines. $W_j$ represents the mass fraction of the component "j" in the sample, and "x" represents a position in a depth direction from a front surface of the sample.

Math. 4 is a fluorescent X-ray intensity theoretical equation in which the primary X-rays entering the sample have a single wavelength and only primary excitation is taken into consideration. As expressed in Math. 4, the theoretical intensity of the analysis component "i" is obtained by integrating from the front surface of the sample to a position at an infinite depth. The theoretical intensity equation of Math. 4 also assumes that a part of the fluorescent X-rays generated inside the sample is absorbed inside the sample and all the fluorescent X-rays that have reached the front surface of the sample are detected. When Math. 4 is rewritten into an expression for the mass fraction of the analysis component "i", Math. 5 is derived.

$$W_i = K_i' I_{Ti} \Sigma \mu_j W_j \quad \text{[Math. 5]}$$

In addition, Math. 6 relating to a mass fraction $W_b$ of a component "b", being a base material component of the sample, is used to derive Math. 7 from Math. 5.

$$W_b = 1 - \sum_{j \neq b} W_j \quad \text{[Math. 6]}$$

$$W_i = K_i' I_{Ti} \left( \mu_b W_b + \sum_{j \neq b} \mu_j W_j \right) = K_i'' I_{Ti} \left( 1 + \sum_{j \neq b} \alpha_j W_j \right) \text{ where} \quad \text{[Math. 7]}$$

$$\alpha_j = \frac{\mu_j - \mu_b}{\mu_b}$$

As described above, calibration curve equation of Math. 1, for a case in which the net intensity is used, can be derived from the theoretical intensity equation for the bulk model. Math. 1 is an excellent approximation correction expression for the analysis of a bulk model sample.

In PTL 2, there is a point disclosing that, in a quantitative analysis using the FP method, a calculation is performed by including the geometry effect in the theoretical intensity calculation for fluorescent X-rays or scattered rays, to thereby be able to obtain an accurate quantitative value with the influence of the geometry effect corrected even when a sample amount (or sample thickness) differs.

In the calibration curve method, a calculation to be performed to obtain an analysis result is simple, and it is easy to verify the calculation. Accordingly, when a sample, for example, oil, is to be analyzed, the calibration curve method using Math. 1 is generally used for a routine analysis. The calibration curve method is also employed in most standards (for example, JIS standard) used in X-ray fluorescence analyses. In addition, in the routine analysis, for example, oil quality control, a fixed amount of samples are set in liquid sample containers having the same shape to be measured.

However, as described above, when a sample, for example, oil, is irradiated with primary X-rays, the primary X-rays deeply penetrate into the sample. Accordingly, when the analysis lines are high-energy fluorescent X-rays, a geometry effect occurs. When the theoretical intensity is calculated through use of the calibration curve equations of from Math. 1 to Math. 3 without considering the geometry effect to calculate a correction coefficient, an analysis error becomes larger.

The present invention has been made in view of the above-mentioned problems, and provides a quantitative analysis method, a quantitative analysis program, and an X-ray fluorescence spectrometer, in which a matrix correction coefficient is calculated by calculating a theoretical intensity in which a geometry effect is reflected through use of an FP method, and then a quantitative analysis is performed through use of the matrix correction coefficient, to thereby be able to perform an accurate quantitative analysis in consideration of the influence of the geometry effect.

Solution to Problem

According to claim 1, there is provided a quantitative analysis method including: a representative composition acquisition step of acquiring a representative composition, which is a composition expressed by contents of analysis components contained in an unknown sample to be analyzed, and which is set to represent the contents of the analysis components; a comparative composition acquisition step of acquiring a plurality of comparative compositions, in each of which the content of one of the analysis components contained in the representative composition is changed by a predetermined content; a detection intensity calculation step of calculating, assuming that a virtual sample having a thickness set in advance and being indicated by each of the representative composition and the comparative compositions has been irradiated with primary X-rays, a detection intensity indicating an intensity of fluorescent X-rays detected under the influence of a geometry effect through use of a fundamental parameter method; and a matrix correction coefficient calculation step of calculating a matrix correction coefficient $\alpha_j$ for each of the analysis components through use of a calibration curve equation expressed by:

$$W_i = (bI_i + c)(1 + \Sigma \alpha_j W_j); \quad \text{[Math. 1]}$$

$$W_i = (aI_i^2 + bI_i + c)(1 + \Sigma \alpha_j W_j); \text{ or} \quad \text{[Math. 2]}$$

$$W_i = bI_i(1 + \Sigma \alpha_j W_j) + c, \text{ where:} \quad \text{[Math. 3]}$$

$W_i$ represents a mass fraction of one component "i" included in the analysis components; "a", "b", and "c" each represent a constant; $I_i$ represents the detection intensity calculated for the component "i" in the detection intensity calculation step; $\alpha_j$ represents the matrix correction coefficient for the component "i" with respect to a coexisting component "j"; and W represents a mass fraction of the coexisting component "j".

According to the quantitative analysis method of claim 2, in the quantitative analysis method of claim 1, the detection intensity calculation step includes: a division step of dividing a thickness of the virtual sample from the surface of the virtual sample to a predetermined position with fixed intervals; and a total sum calculation step of calculating a total sum of the detection intensity calculated for each of the divisions.

According to the quantitative analysis method of claim 3, in the quantitative analysis method of claim 1 or 2, the detection intensity calculation step includes: an emission intensity calculation step of calculating, assuming that the virtual sample indicated by each of the representative composition and the comparative compositions has been irradiated with primary X-rays, an emission intensity indicating the intensity of the fluorescent X-rays emitted from each of the analysis components, as a function of a position from the front surface of the virtual sample with the geometry effect being ignored; a detection ratio acquisition step of acquiring, assuming that a virtual sample indicated by a given composition has been irradiated with primary X-rays, a detection ratio as the function of the position from the front surface, the detection ratio representing a ratio between an emission intensity indicating the intensity of the fluorescent X-rays emitted from the virtual sample and the detection intensity of the fluorescent X-rays detected under the influence of the geometry effect for the lines of emitted fluorescent X-rays; and a multiplication step of multiplying the emission intensity by the detection ratio to calculate the detection intensity as the function of the position from the front surface.

According to the quantitative analysis method of claim 4, in the quantitative analysis method of any one of claims 1 to 3, the quantitative analysis method further includes: a standard sample measuring step of irradiating a plurality of standard samples containing the analysis components and having known contents with primary X-rays, and measuring the intensity of the fluorescent X-rays emitted from each of the analysis components; a calibration curve creation step of creating a calibration curve expressed by the calibration curve equation for each of the analysis components, based on the intensity of the fluorescent X-rays measured in the standard sample measuring step and the matrix correction coefficient; an unknown sample measuring step of irradiating the unknown sample with primary X-rays, and measuring the intensity of the fluorescent X-rays for each of the analysis components; and a content calculation step of calculating the content of each of the analysis components contained in the unknown sample, based on the intensity of the fluorescent X-rays measured in the unknown sample measuring step and the calibration curve.

According to the quantitative analysis method of claim 5, in the quantitative analysis method of claim 2, the predetermined position is set to: a position at which the detection intensity becomes 0 when a thickness of the unknown sample is larger than a thickness from the front surface to the position at which the detection intensity becomes 0; and a position of a back surface of the unknown sample when the thickness of the unknown sample is smaller than the thickness from the front surface to the position at which the detection intensity becomes 0.

According to the quantitative analysis method of claim 6, in the quantitative analysis method of claim 1, the detection intensity calculation step is a step of calculating the detection intensity through use of a Monte Carlo simulation, and the detection intensity calculation step includes the steps of: setting, as parameters, a thickness of the virtual sample, the intensity of the primary X-rays to be applied to each position on the front surface of the virtual sample, and an incident angle with respect to the front surface of the primary X-rays; determining, based on randomly determined values, a generation position of the primary X-rays on an X-ray tube target, a direction in which the primary X-rays are emitted, and energy of the primary X-rays; and calculating the intensity of the fluorescent X-rays for a predetermined position using the detection intensity for each trajectory from the generation position of the primary X-rays to the front surface.

According to claim 7, there is provided a quantitative analysis program to be executed by a computer used for an X-ray fluorescence spectrometer, the quantitative analysis program causing the computer to execute: a representative composition acquisition step of acquiring a representative composition, which is a composition expressed by contents of analysis components contained in an unknown sample to be analyzed, and which is set to represent the contents of the analysis components; a comparative composition acquisition step of acquiring a plurality of comparative compositions, in each of which the content of one of the analysis components contained in the representative composition is changed by a predetermined content; a detection intensity calculation step of calculating, assuming that a virtual sample having a thickness set in advance and being indicated by each of the representative composition and the comparative compositions has been irradiated with primary X-rays, a detection intensity indicating an intensity of fluorescent X-rays detected under the influence of a geometry effect through use of a fundamental parameter method; and a matrix correction coefficient calculation step of calculating a matrix correction coefficient $\alpha_j$ for each of the analysis components through use of a calibration curve equation expressed by:

$$W_i = (bI_i + c)(1 + \Sigma \alpha_j W_j);$$ [Math. 1]

$$W_i = (aI_i^2 + bI_i + c)(1 + \Sigma \alpha_j W_j); \text{ or}$$ [Math. 2]

$$W_i = bI_i(1 + \Sigma \alpha_j W_j) + c, \text{ where:}$$ [Math. 3]

$W_i$ represents a mass fraction of one component "i" included in the analysis components; "a", "b", and "c" each represent a constant; $I_i$ represents the detection intensity calculated for the component "i" in the detection intensity calculation step; $\alpha_j$ represents the matrix correction coefficient for the component "i" with respect to a coexisting component "j"; and $W_j$ represents a mass fraction of the coexisting component "j".

According to claim 8, there is provided an X-ray fluorescence spectrometer including: a representative composition acquisition module configured to acquire a representative composition, which is a composition expressed by contents of analysis components contained in an unknown sample to be analyzed, and is set to represent the contents of the analysis components; a comparative composition acquisition module configured to acquire a plurality of comparative compositions, in each of which the content of one of the analysis components contained in the representative composition is changed by a predetermined content; a detection intensity calculation module configured to calculate, assuming that a virtual sample having a thickness set in advance and being indicated by each of the representative composition and the comparative compositions has been irradiated with primary X-rays, a detection intensity indicating an intensity of fluorescent X-rays detected under the influence of a geometry effect through use of a fundamental parameter method; and a matrix correction coefficient calculation module configured to calculate a matrix correction coefficient $\alpha_j$ for each of the analysis components through use of a calibration curve equation expressed by:

$$W_i = (bI_i + c)(1 + \Sigma \alpha_j W_j);$$ [Math. 1]

$$W_i = (aI_i^2 + bI_i + c)(1 + \Sigma \alpha_j W_j); \text{ or}$$ [Math. 2]

$$W_i = bI_i(1 + \Sigma \alpha_j W_j) + c, \text{ where:}$$ [Math. 3]

$W_i$ represents a mass fraction of one component "i" included in the analysis components; "a", "b", and "c" each represent a constant; $I_i$ represents the detection intensity calculated for the component "i" by the detection intensity calculation module; $\alpha_j$ represents the matrix correction coefficient for the component "i" with respect to a coexisting component "j"; and $W_j$ represents a mass fraction of the coexisting component "j".

Advantageous Effects of Invention

According to the invention of claims 1 to 8, it is possible to perform a highly accurate quantitative analysis in consideration of the influence of the geometry effect.

DESCRIPTION OF EMBODIMENTS

Figure 1:
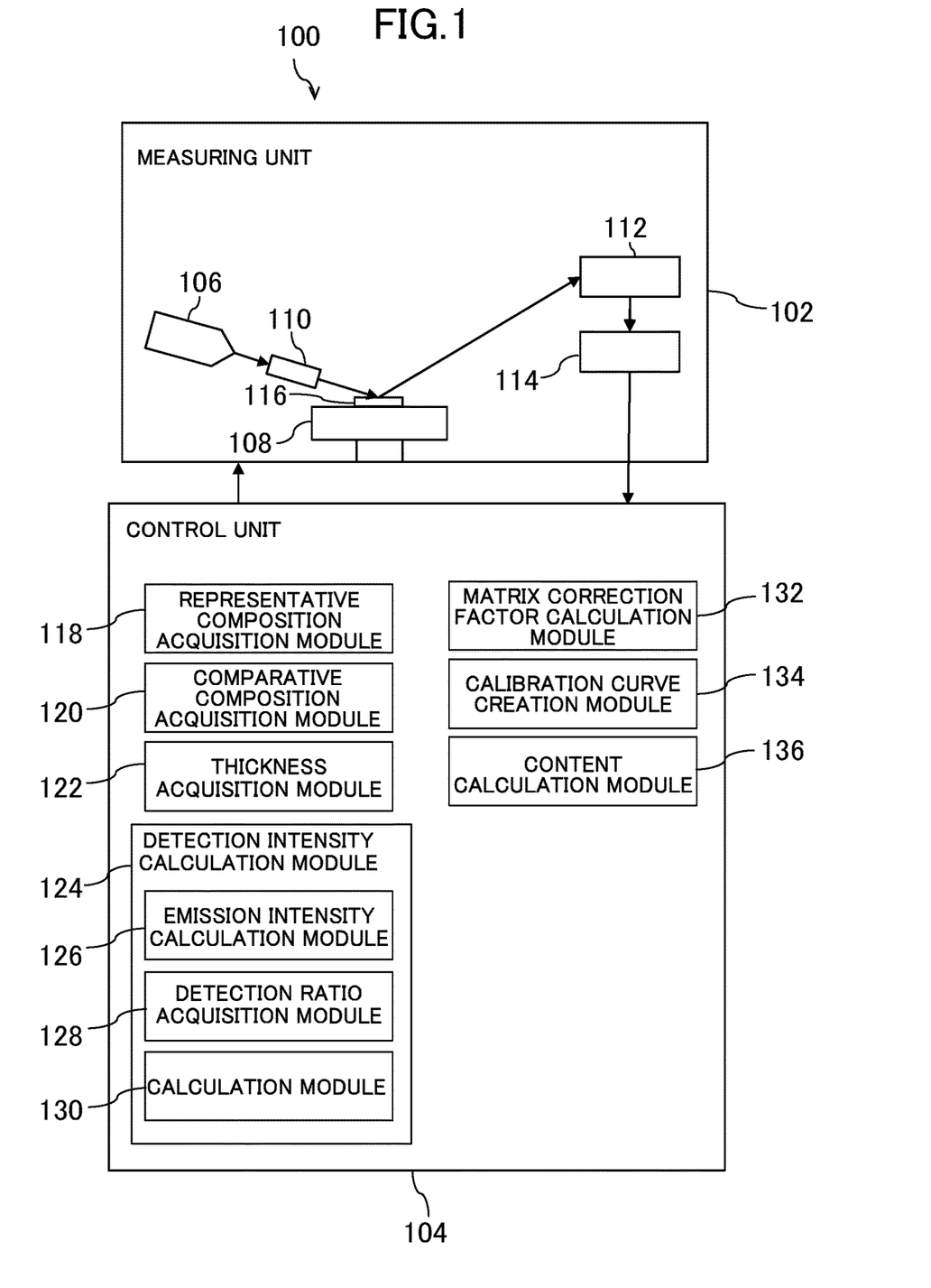
FIG. 1 is a schematic diagram illustrating an X-ray fluorescence spectrometer according to an embodiment of the present invention.

Now, a preferred embodiment (hereinafter referred to as "embodiment") for carrying out the present invention will be described. FIG. 1 is a diagram for illustrating an outline of an X-ray fluorescence spectrometer 100.

As illustrated in FIG. 1, the X-ray fluorescence spectrometer 100 includes a measuring unit 102 and a control unit 104. The measuring unit 102 includes an X-ray source 106, a sample stage 108, an X-ray filter 110, a detector 112, and a counter 114. The measuring unit 102 irradiates a sample 116 with primary X-rays to measure an intensity of the fluorescent X-rays emitted from the sample 116.

The X-ray source 106 irradiates a front surface of the sample 116 with primary X-rays through the X-ray filter 110. Fluorescent X-rays are emitted from the sample 116 irradiated with the primary X-rays.

The sample 116 is arranged on the sample stage 108. The sample stage 108 may be configured so that a height at which the sample 116 is arranged can be changed.

The X-ray filter 110 absorbs a specific wavelength component contained in the primary X-rays. The X-ray filter 110 may be arranged at both locations between the X-ray source 106 and the sample 116, and between the sample 116 and the detector 112. There is also a case in which the X-ray filter 110 is not used depending on an analysis line.

The detector 112 is, for example, a silicon drift semiconductor detector (SDD) having excellent energy resolution. The SDD simultaneously measures full energy fluorescent X-rays. The detector 112 measures the intensity of the fluorescent X-rays, and outputs a pulse signal having a pulse height corresponding to the energy of the measured fluorescent X-rays.

Based on the pulse heights, the counter 114 counts the pulse signal output as the intensities measured by the detector 112. Specifically, for example, the counter 114 is a multi-channel analyzer, and counts the pulse signal output by the detector 112 for each of channels corresponding to the energy of the fluorescent X-rays, and outputs the count as the intensity of the fluorescent X-rays.

The control unit 104 controls operations of each part of the measuring unit 102. The control unit 104 also receives a user's input to perform a quantitative analysis. Specifically, the control unit 104 is a computer included in the X-ray fluorescence spectrometer 100, and includes a storage unit (not shown) storing a program therein.

The control unit 104 may be a computer provided outside the X-ray fluorescence spectrometer 100 and connected to the X-ray fluorescence spectrometer 100. The program is a program to be executed by a computer for use in the X-ray fluorescence spectrometer 100, and is a program for causing the computer to execute each of steps included in a quantitative analysis method that will be described later.

Figure 2:
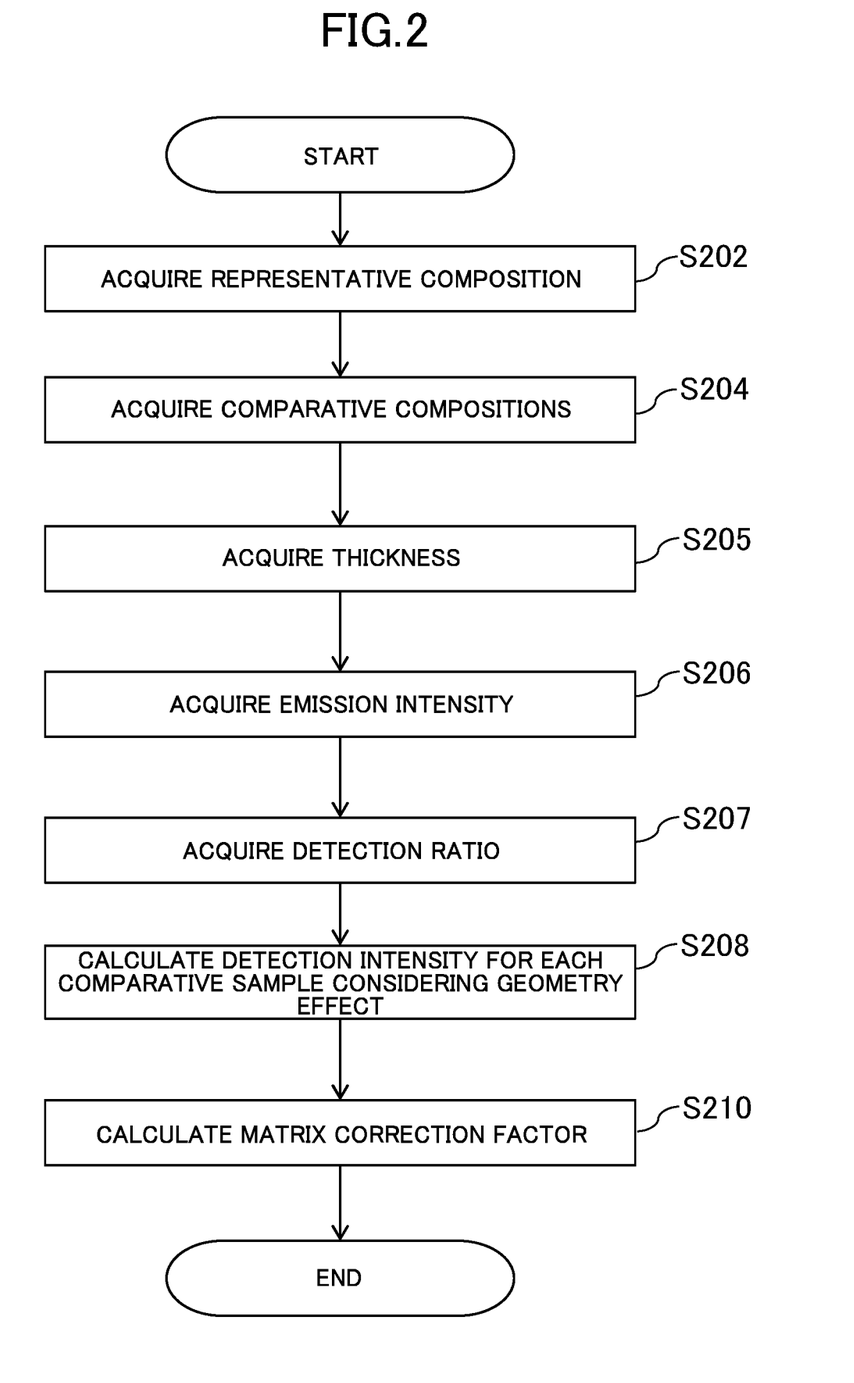
FIG. 2 is a flow chart illustrating a method of calculating a matrix correction coefficient in this embodiment.
Figure 3:
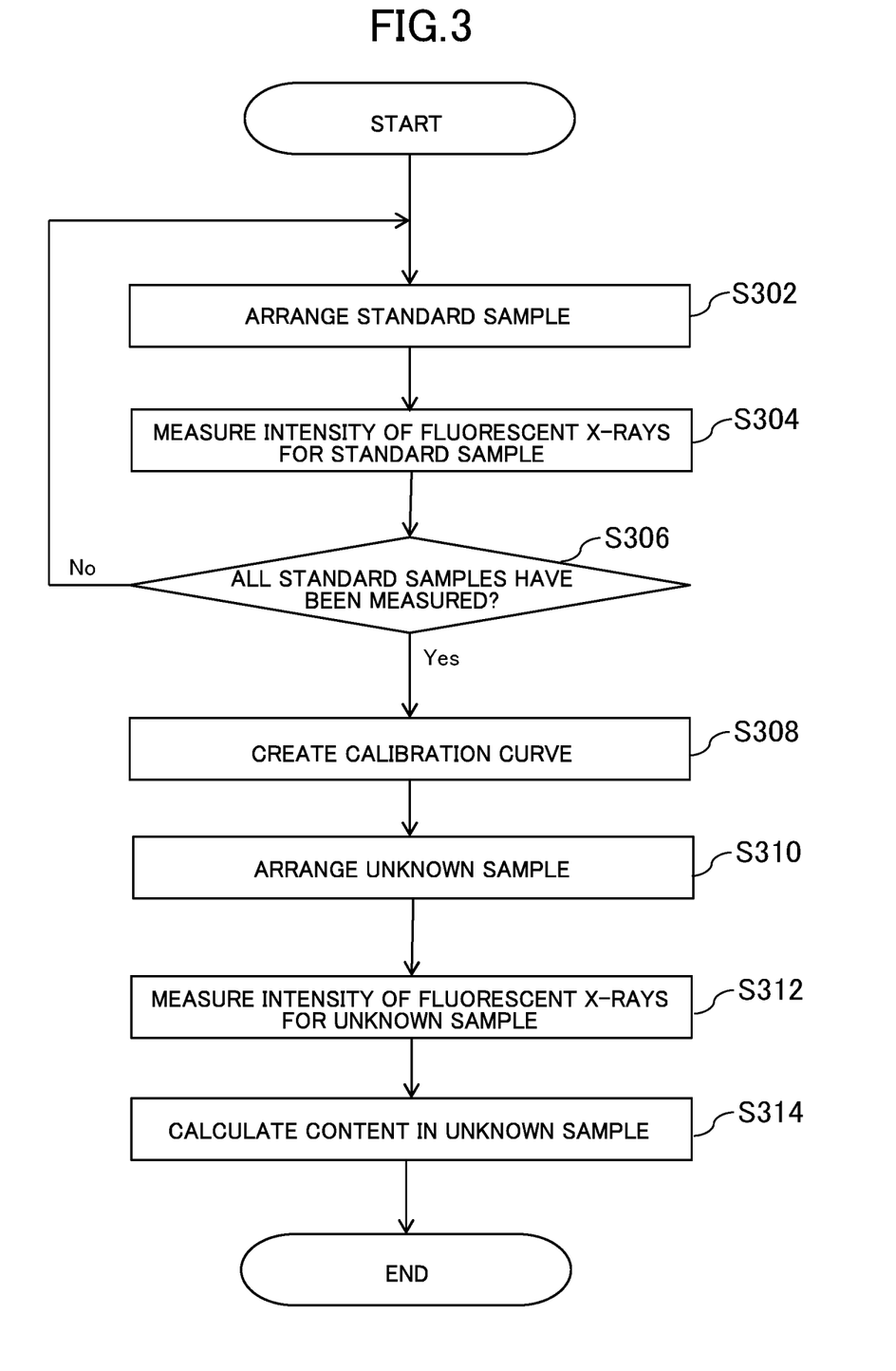
FIG. 3 is a flow chart illustrating a method of calculating a content in this embodiment.

The control unit 104 includes a representative composition acquisition module 118, a comparative composition acquisition module 120, a thickness acquisition module 122, a detection intensity calculation module 124, a matrix correction coefficient calculation module 132, a calibration curve creation module 134, and a content calculation module 136. A function of each module included in the control unit 104 will be described with reference to flow charts of FIG. 2 and FIG. 3. FIG. 2 is a diagram illustrating a method of calculating a matrix correction coefficient, and FIG. 3 is a diagram illustrating a method of calculating a content through use of the matrix correction coefficient.

First, the representative composition acquisition module 118 acquires a representative composition, which is a composition expressed by contents of analysis components contained in an unknown sample to be analyzed, and is set to represent the contents of the analysis components (Step S202). Specifically, for example, the user inputs the numerical values of contents shown in Table 1 as a representative composition to an input unit (not shown). The representative composition acquisition module 118 acquires the input data as the representative composition. The unit of numerical values in Table 1 is mass %. An example of the representative composition expressed by the composition of Table 1 is oil, and a base material thereof is $CH_2$.

TABLE 1

| Sn | Pb | Ca | S | $CH_2$ |
|---|---|---|---|---|
| 0.10 | 0.01 | 0.01 | 0.01 | 99.87 |

Subsequently, the comparative composition acquisition module 120 acquires a plurality of comparative compositions, in each of which the content of one of the analysis components contained in the representative composition is changed by a predetermined content (Step S204). Specifically, for example, the comparative composition acquisition module 120 acquires each content of a comparative composition formed by increasing the content of Sn of the representative composition by a predetermined content of 0.10 mass % and decreasing the content of $CH_2$ by 0.10 mass %.

In the same manner, the comparative composition acquisition module 120 acquires each content of each comparative composition formed by increasing Pb, Ca, or S by 0.10 mass % and decreasing the content of $CH_2$ by 0.10 mass %. That is, the comparative composition acquisition module 120 acquires comparative compositions exhibiting each content of four comparative compositions. A magnitude of the content to be changed may be the same for each analysis component.

Subsequently, the thickness acquisition module 122 acquires a thickness set in advance as a thickness of a virtual sample indicated by each of the representative composition and the comparative compositions (Step S205). Specifically, for example, the thickness acquisition module 122 acquires data indicating a thickness of 8.0 mm input by the user as the thickness of the virtual sample. Step S202, Step S204, and Step S205 are in no particular order.

Subsequently, the detection intensity calculation module 124 calculates a detection intensity indicating an intensity of fluorescent X-rays detected under the influence of a geometry effect through use of a fundamental parameter method, assuming that the virtual sample having the thickness set in advance, and being indicated by each of the representative composition and the comparative compositions, has been irradiated with primary X-rays (Step S206 to Step S208). Specifically, for example, the detection intensity calculation module 124 includes an emission intensity calculation module 126, a detection ratio acquisition module 128, and a calculation module 130, to thereby calculate the detection intensity.

The emission intensity calculation module 126 calculates an emission intensity indicating the intensity of the fluorescent X-rays emitted from each analysis component, as a function of a position from the front surface of the virtual sample with the geometry effect being ignored, assuming that the virtual sample indicated by each of the representative composition and the comparative compositions has been irradiated with primary X-rays (Step S206). Specifically, first, the emission intensity calculation module 126 divides a thickness of the virtual sample from the front surface of the virtual sample to a predetermined position with fixed intervals. For example, the emission intensity calculation module 126 divides a virtual sample set to have a thickness of 8.0 mm into layers of 1.0 mm in a direction perpendicular to the front surface, and calculates the intensity of the fluorescent X-rays emitted from each layer through use of the FP method.

A position of each layer of the virtual sample set to have a thickness of 8.0 mm is shown in the first column of Table 2. An example of an emission intensity of a Sn Kα line calculated for the virtual sample indicated by the representative composition is shown in the second column of Table 2. In the above-mentioned calculation, the density of the main component $CH_2$ is set to 0.9 $g/cm^3$, and the values of density of the other components are set to a bulk density.

TABLE 2

| Position | Emission intensity at each layer | Detection ratio | Detection intensity |
|---|---|---|---|
| 0.5 | 0.6874 | 0.9545 | 0.6562 |
| 1.5 | 0.6399 | 0.8636 | 0.5527 |
| 2.5 | 0.5957 | 0.7727 | 0.4603 |
| 3.5 | 0.5545 | 0.6818 | 0.3781 |
| 4.5 | 0.5162 | 0.5909 | 0.3050 |
| 5.5 | 0.4805 | 0.5000 | 0.2403 |
| 6.5 | 0.4473 | 0.4091 | 0.1830 |
| 7.5 | 0.4164 | 0.3182 | 0.1325 |
| Total | 3.4743 | | 2.5925 |

Subsequently, assuming that a virtual sample indicated by a given composition has been irradiated with primary X-rays, the detection ratio acquisition module 128 acquires a detection ratio as the function of the position from the front surface, the detection ratio representing a ratio between an emission intensity indicating the intensity of the fluorescent X-rays emitted from the virtual sample and the detection intensity of the fluorescent X-rays detected under the influence of the geometry effect for the lines of emitted fluorescent X-rays (Step S207).

For example, the detection ratio acquisition module 128 calculates, as a function f(x), a detection ratio representing a ratio where the emitted fluorescent X-rays are detected under an environment in which the geometry effect occurs. In this case, "x" represents a position from the front surface of the sample, which is a depth at which the primary X-rays penetrate in the direction perpendicular to the front surface of the sample. The function f(x) being the detection ratio is 1.0 at the front surface of the sample (x=0), and is a relative intensity at the position "x" with respect to an X-ray intensity detected at the front surface of the sample.

Specifically, the detection ratio acquisition module 128 acquires, for each of the divisions, a ratio at which the fluorescent X-rays emitted from each of the layers divided as described above is detected by the detector 112. For example, to experimentally acquire the detection ratio f(x), the measuring unit 102 measures the intensity of the fluorescent X-rays in a state in which a flat plate sample containing the analysis component is arranged on the sample stage 108. In this case, a metal plate or another flat plate sample having a shallow measurement depth is used.

In addition, the measuring unit 102 measures the intensity of the fluorescent X-rays in a state in which the position of the sample stage 108 is moved to each of the positions shown in Table 2 in the direction perpendicular to the front surface of the flat plate sample (that is, moved from 0.5 mm to 7.5 mm at intervals of 1.0 mm). The detection ratio acquisition module 128 acquires, as f(x), a ratio of the intensity after the movement to the intensity before the movement. The detection ratio acquisition module 128 acquires the detection ratio when the user inputs f(x) obtained in the experiment to the control unit 104. An example of the acquired detection ratio is shown in the third column of Table 2.

Figure 4:
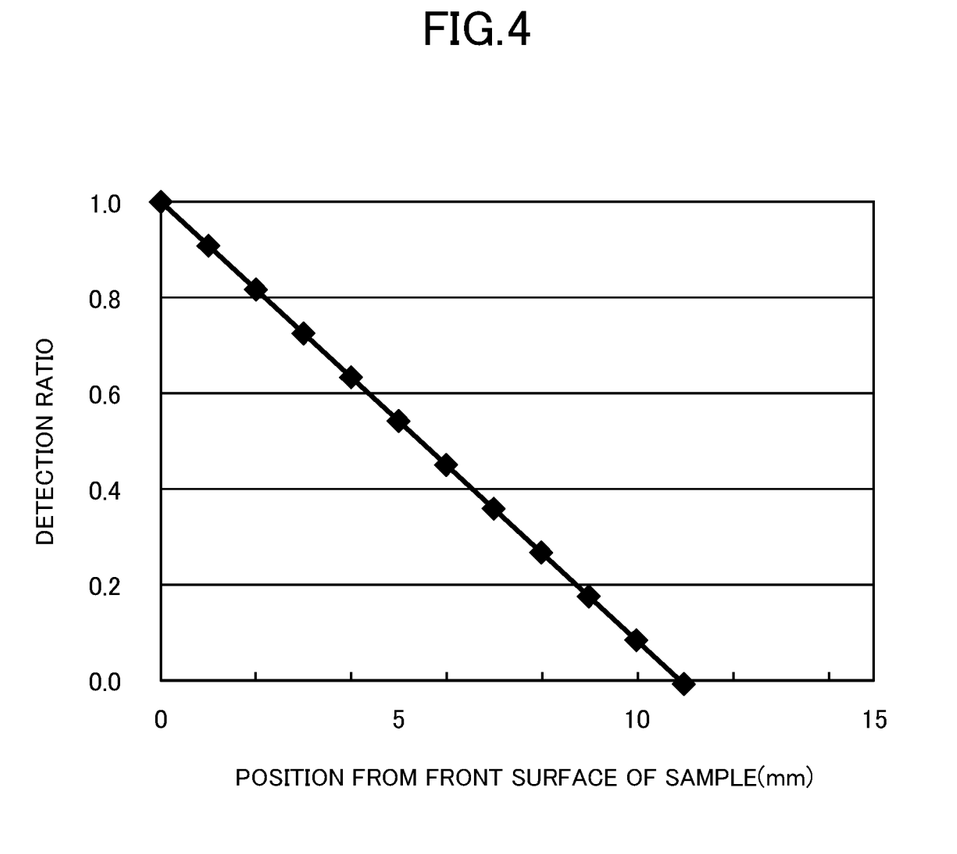
FIG. 4 is a graph showing an example of a detection ratio.

FIG. 4 is a graph for showing a relationship between the detection ratio shown in the third column of Table 2 and the position from the front surface of the sample. As shown in FIG. 4, the detection ratio linearly changes in accordance with the position "x", and the detection ratio becomes 0 at the position 11.0 mm. That is, when the position is larger than a predetermined value, the detection ratio is 0. This characteristic is a general characteristic of an energy-dispersive X-ray fluorescence spectrometer.

In Step S207, the detection ratio acquisition module 128 may acquire f(x) expressed by the product of a relative detection area g(x) and a relative solid angle Q(x). Specifically, the relative detection area g(x) represents an area in which the fluorescent X-rays are detected at the position "x" from the front surface of the sample relative to the front surface of the sample. The relative detection area g(x) is a function that greatly depends on an optical system of an apparatus, and has a value of 1.0 at the front surface of the sample (x=0). For example, when the X-ray fluorescence spectrometer 100 is a wavelength-dispersive X-ray fluorescence spectrometer, a detection region 702 on the sample 116 changes depending on a 2θ angle even when the same detector 112 is used.

The relative solid angle Q(x) represents a solid angle of the opening portion of the detector 112 that detects the fluorescent X-rays generated at the position "x" from the front surface of the sample. When the X-ray fluorescence spectrometer 100 is a wavelength-dispersive X-ray fluorescence spectrometer, Ω(x) can be approximated to 1.0 irrespective of the position "x" due to a long distance between the sample 116 and the detector 112. However, when the X-ray fluorescence spectrometer 100 is an energy-dispersive X-ray fluorescence spectrometer, the distance between the sample 116 and the detector 112 is short. In this case, the value of Ω(x) changes depending on the position "x". Normally, Ω(x) is a function that is inversely proportional to the square of the distance between a certain position inside the sample and the detector 112. The detection ratio acquisition module 128 may acquire f(x) expressed by the product of the relative detection area g(x) and the relative solid angle Ω(x) obtained by a calculation instead of an experiment.

Subsequently, the calculation module 130 multiplies the emission intensity by the detection ratio to calculate the detection intensity as the function of the position from the front surface (Step S208). Specifically, for example, the detection intensity calculation module 124 calculates the detection intensity by multiplying the emission intensity at each layer by the detection ratio for each layer. An example of the acquired detection intensity is shown in the fourth column of Table 2.

Then, the calculation module 130 uses Math. 8 to add up the detection intensities at the layers. Specifically, the calculation module 130 calculates a value of 2.5925 as a total sum of the detection intensities at the layers divided at the intervals of 1.0 mm. The thickness of 8.0 mm is acquired in Step S202, and hence the detection intensities are integrated up to x=8 mm in Math. 8.

$$\text{detection intensity} = \sum_{x=0\ mm}^{x=8\ mm} f(x) \times \text{intensity at each layer} \qquad [\text{Math. 8}]$$

Table 2 shows only the intensities of the Sn Kα line acquired for the virtual sample indicated by the representative composition. However, in Step S208, total values of the detection intensities for all the analysis components of the representative composition and the comparative compositions are calculated. The fluorescent X-rays (analytical lines) for which the detection intensities are to be calculated are the Sn Kα line (25.2 keV), the Pb Lβ1 line (12.6 keV), a Ca Kα line (3.7 keV), and a S Kα line (2.3 keV) for each composition.

As shown in Table 2, the emission intensity of the Sn Kα line obtained when the distance from the front surface of the sample is 7.5 mm is 61% of that obtained when the distance is 0.5 mm. However, the detection intensity of the Sn Kα line obtained when the distance from the front surface of the sample is 7.5 mm is 20% of that obtained when the distance is 0.5 mm. That is, it can be understood that the detection intensity becomes higher at a position closer to the front surface of the sample.

Subsequently, the matrix correction coefficient calculation module 132 calculates each matrix correction coefficient $\alpha_j$ for each analysis component through use of the calibration curve equation expressed by Math. 1, Math. 2, or Math. 3 (Step S210). In this case, as described above, $W_i$ is a value representing the mass fraction (mass %) of one component "i" included in the analysis components, and "a", "b", and "c" are constants. A detection intensity $I_i$ is a value calculated in a detection intensity calculation step for the component "i", and $\alpha_j$ is a value representing the matrix correction coefficient for the component "i" with respect to the coexisting component "j". $W_j$ is a value representing the mass fraction (mass %) of the coexisting component "j".

Specifically, the matrix correction coefficient calculation module 132 calculates the matrix correction coefficient based on the total value of the detection intensities calculated in Step S208. For example, a matrix correction model used to calculate the matrix correction coefficient is a model using $CH_2$ as the base material and including the analysis component in a correction term. When Math. 1 is used in a case where the analysis component is Sn and correcting components are Pb, Ca, and S, Math. 1 is expressed by Math. 9.

$$W_{Sn}=(bI_{Sn}+c)(1+\alpha_{Pb}W_{Pb}+\alpha_{Ca}W_{Ca}+\alpha_{S}W_{S}) \qquad [\text{Math. 9}]$$

The matrix correction coefficient calculation module 132 calculates $\alpha_{Pb}$, $\alpha_{Ca}$, and $\alpha_S$ through use of Math. 9 and the comparative compositions, in each composition of which one of the contents of Pb, Ca, and S, being the correcting components, is changed. In the same manner, the matrix correction coefficient calculation module 132 calculates the matrix correction coefficients for cases in which the analysis components are Pb, Ca, and S. Table 3 is an example showing the calculated matrix correction coefficients.

TABLE 3

| Correcting component | Analysis component | | | |
|---|---|---|---|---|
| | Sn | Pb | Ca | S |
| Sn | 0.1318 | 0.3301 | 0.1454 | 0.0642 |
| Pb | 0.2687 | 0.5066 | 0.3744 | 0.1028 |
| Ca | 0.0311 | 0.2028 | 0.0807 | 0.0233 |
| S | 0.0120 | 0.0990 | 0.0015 | 0.0480 |

Table 4 is an example showing the matrix correction coefficient in a comparative example. Table 4 shows results of calculating the matrix correction coefficients by calculating theoretical intensities by the FP method through use of the bulk model expressed by Math. 2 based on a related-art method.

TABLE 4

| Correcting component | Analysis component | | | |
|---|---|---|---|---|
| | Sn | Pb | Ca | S |
| Sn | 0.6614 | 0.6436 | 0.1443 | 0.0632 |
| Pb | 1.2559 | 1.0071 | 0.3623 | 0.1023 |
| Ca | 0.1640 | 0.4194 | 0.0808 | 0.0213 |
| S | 0.0782 | 0.2113 | 0.0016 | 0.0480 |

In comparison between Table 3 and Table 4, the matrix correction coefficients exhibit larger differences as the energy of the analysis line becomes larger and the position from the front surface of the sample becomes farther. Meanwhile, the differences between the matrix correction coefficients for Ca and S, in which primary X-rays penetrate only at a position close to the front surface of the sample, are smaller than the differences between the matrix correction coefficients for Sn and Pb. That is, Ca and S exert a smaller influence of the geometry effect than that of Sn and Pb. As described above, the matrix correction coefficients in which the influence of the geometry effect is reflected are obtained by the processing steps of from Step S202 to Step S210.

Next, a method of calculating the content through use of the matrix correction coefficient obtained in the flow chart illustrated in FIG. 2 will be described with reference to the flow chart illustrated in FIG. 3.

First, the measuring unit 102 irradiates a plurality of standard samples containing analysis components and having known contents with primary X-rays, and measures the intensity of the fluorescent X-rays emitted from each analysis component. Specifically, the standard sample having the thickness acquired in Step S205 is arranged on the sample stage 108 (Step S302). The standard sample contains the same components as those of a representative sample, and the content of each component is known.

Subsequently, the standard sample is irradiated with primary X-rays, and the intensities of the Sn Kα line (25.2 keV), the Pb Lβ1 line (12.6 keV), the Ca Kα line (3.7 keV), and the S Kα line (2.3 keV) that have been emitted are measured (Step S304). In this case, the analysis lines to be measured are the same as the analysis lines for which the detection intensities are to be calculated in Step S208. The intensities of the fluorescent X-rays are measured for a sufficient number of standard samples for creating a calibration curve. When all the standard samples are measured in Step S304, the process advances to Step S308, and when there is an unmeasured standard sample, the process returns to Step S302 (Step S306).

In this embodiment, the intensities of the fluorescent X-rays were acquired for eight standard samples having mutually different contents of each component. Table 5 is a table showing the content of each of components contained in each standard sample and the intensity of an analysis line corresponding to each component. The intensities of the analysis lines shown in Table 5 are actually measured values, being the results of actual measurement.

TABLE 5

| Sample No. | Sn | | Pb | | Ca | | S | | CH$_2$ |
|---|---|---|---|---|---|---|---|---|---|
| | Content (mass %) | X-ray intensity | Content (mass %) | X-ray intensity | Content (mass %) | X-ray intensity | Content (mass %) | X-ray intensity | Content (mass %) |
| 1 | 0.01 | 2.9080 | 0.01 | 4.6221 | 0.01 | 1.5836 | 0.01 | 1.6995 | 99.98 |
| 2 | 0.10 | 28.7508 | 0.01 | 4.4964 | 0.01 | 1.5631 | 0.01 | 1.6898 | 99.98 |
| 3 | 1.00 | 257.4605 | 0.01 | 3.4982 | 0.01 | 1.3852 | 0.01 | 1.5981 | 99.98 |
| 4 | 0.10 | 22.7858 | 1.00 | 303.4564 | 0.01 | 1.1462 | 0.01 | 1.5348 | 99.98 |
| 5 | 0.10 | 27.9062 | 0.01 | 3.7694 | 1.00 | 144.9419 | 0.01 | 1.6520 | 98.99 |
| 6 | 0.10 | 28.4196 | 0.01 | 4.1096 | 0.01 | 1.3278 | 1.00 | 161.3731 | 98.99 |
| 7 | 0.50 | 119.5074 | 0.50 | 148.0892 | 0.50 | 57.3102 | 0.50 | 76.1046 | 99.00 |
| 8 | 0.10 | 25.7357 | 0.40 | 138.1462 | 0.40 | 50.2537 | 0.40 | 63.3232 | 99.20 |

Subsequently, the calibration curve creation module 134 creates a calibration curve expressed by the calibration curve equation for each analysis component, based on the intensity of the fluorescent X-rays measured in each standard sample measuring step and the matrix correction coefficient (Step S308). Specifically, the calibration curve creation module 134 uses the contents and X-ray intensities for each standard sample shown in Table 5 and the matrix correction coefficients shown in Table 3 to create a calibration curve equation of Math. 1 in which the constants "b" and "c" have been specified.

Subsequently, the measuring unit 102 irradiates an unknown sample with primary X-rays, and measures the intensity of the fluorescent X-rays for each analysis component. Specifically, the unknown sample containing the same components as those of the representative sample and without knowing contents of the components is arranged on the sample stage 108 (Step S310). In this case, the thickness of the unknown sample is 8.0 mm, being the thickness acquired in Step S205. Then, the unknown sample is irradiated with primary X-rays, and the intensities of the Sn Kα line (25.2 keV), the Pb Lβ1 line (12.6 keV), the Ca Kα line (3.7 keV), and the S Kα line (2.3 keV) that have been emitted are measured. In this case, the analysis lines to be measured are the same as the analysis lines for which the detection intensities are to be calculated in Step S208.

Subsequently, the content calculation module 136 calculates the content of each analysis component contained in the unknown sample, based on the intensity of the fluorescent X-rays measured in an unknown sample measuring step of Step S312 and the calibration curve (Step S314). Specifically, for example, the content calculation module 136 calculates each content based on the calibration curve equation (Math. 1) including the constants "b" and "c" determined by the calibration curve, the intensity $I_i$ of the fluorescent X-rays acquired in the measuring step, a, representing the matrix correction coefficient, and $W_j$ representing the mass fraction of the coexisting component "j". In this case, the constants "b" and "c" determined by the calibration curve are the constants acquired in Step S308.

Figure 5:
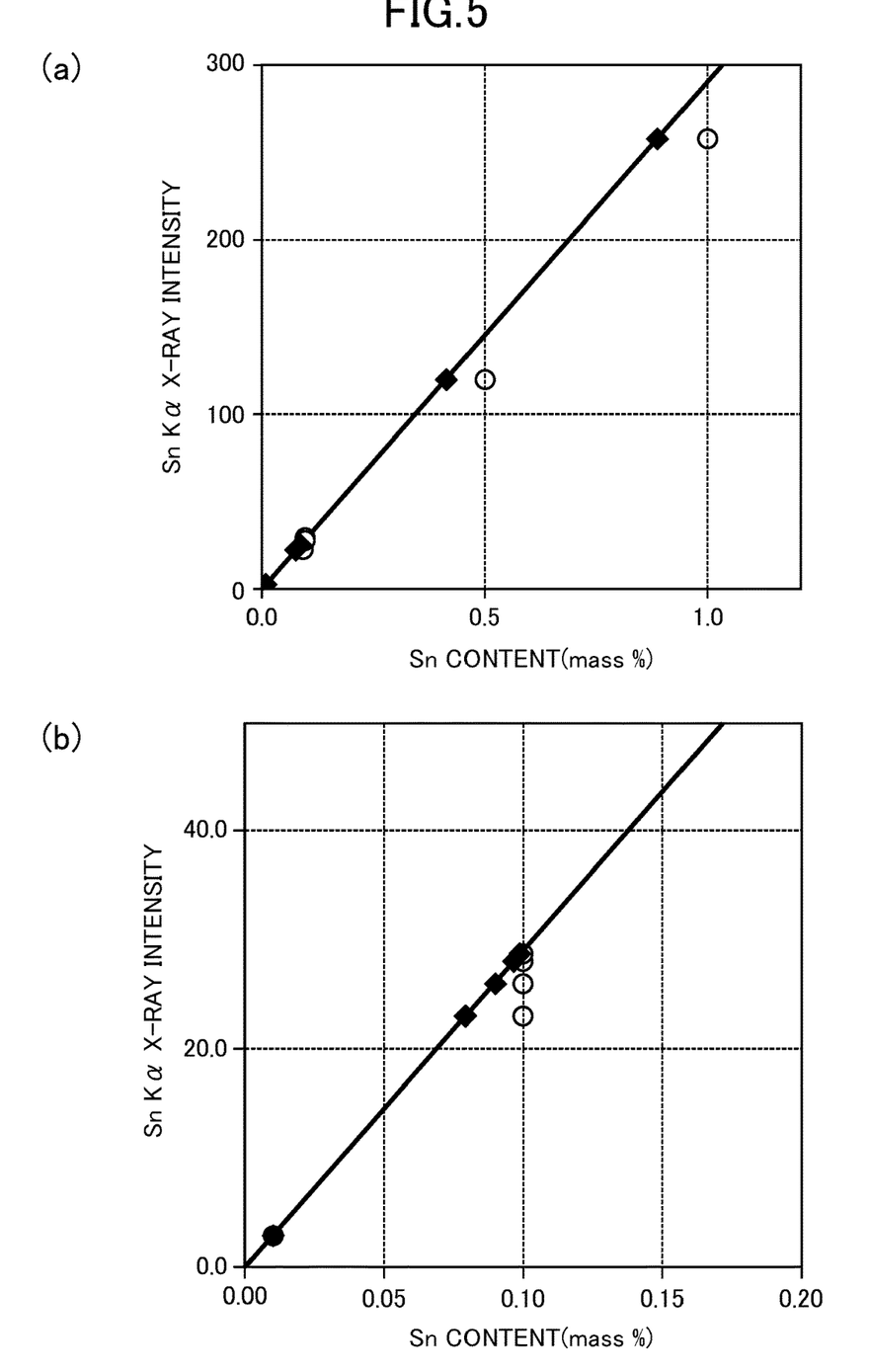
FIG. 5 are graphs showing an example of a Sn calibration curve in this embodiment.

FIG. 5(a) and FIG. 5(b) are graphs showing a calibration curve of Sn acquired in Step S308. FIG. 5(b) is an enlarged graph of a region exhibiting a low content range in FIG. 5(a). The circles of FIG. 5(a) and FIG. 5(b) are data showing relationships between the X-ray intensities and the contents obtained before matrix correction was performed (that is, data shown in Table 5). The diamond-shaped marks of FIG. 5(a) and FIG. 5(b) are data showing relationships between the X-ray intensities and the contents (estimated reference values) obtained after the matrix correction was performed through use of the matrix correction coefficients shown in Table 3. The straight lines of FIG. 5(a) and FIG. 5(b) are straight lines obtained by approximating the data obtained after the matrix correction by a linear equation.

Figure 6:
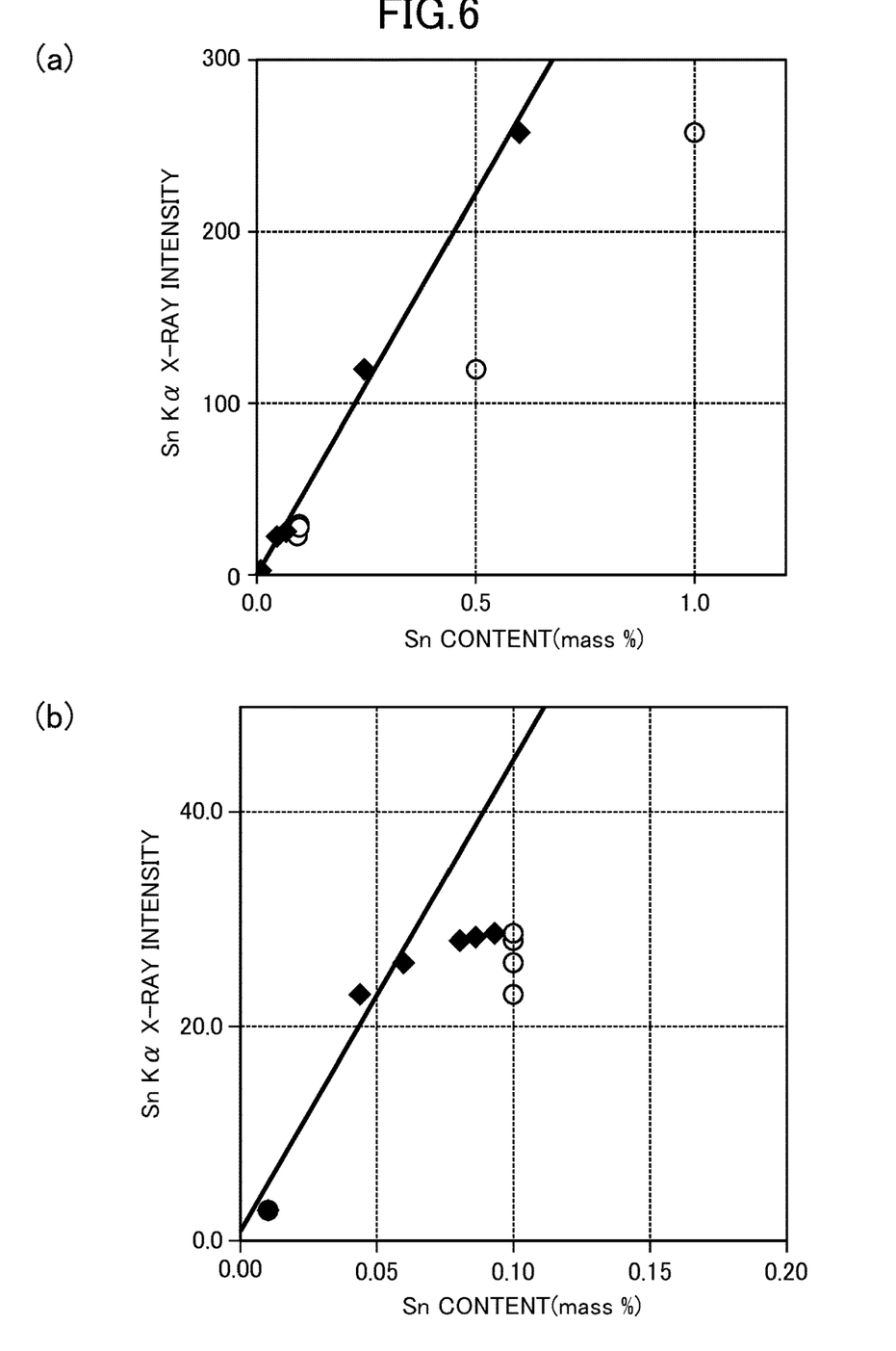
FIG. 6 are graphs showing an example of a Sn calibration curve in a comparative example.

FIG. 6(a) and FIG. 6(b) are graphs showing a calibration curve of Sn as a comparative example. FIG. 6(b) is an enlarged graph of a region exhibiting a low content range in FIG. 6(a). The circles of FIG. 6(a) and FIG. 6(b) are the same as those of FIG. 5. The diamond-shaped marks of FIG. 6(a) and FIG. 6(b) are data showing relationships between the X-ray intensities and the contents (estimated reference values) obtained after the matrix correction was performed through use of the matrix correction coefficients (matrix correction coefficients calculated based on the bulk model) shown in Table 4. The straight lines of FIG. 6(a) and FIG. 6(b) are the same as those of FIGS. 5.

In FIG. 5(a) and FIG. 5(b), the data obtained after the matrix correction has smaller deviations and are closer to the straight line (so-called coefficient of determination is higher) than in FIG. 6(a) and FIG. 6(b). Accordingly, it was verified that the accuracy of the matrix correction can be improved through use of the matrix correction coefficient with the geometry effect taken into consideration, rather than the matrix correction coefficient calculated by the bulk model without the geometry effect taken into consideration.

Although not shown, in the same manner as the calibration curve of Sn, a calibration curve of Pb was successfully obtained having higher accuracy of matrix correction compared to that in the comparative example. Meanwhile, as shown in Table 3 and Table 4, the differences between the matrix correction coefficients for Ca and S are small. Accordingly, in both the comparative example and this embodiment, calibration curves of Ca and S having high accuracy of matrix correction were successfully obtained.

The calibration curve creation module 134 may use the contents and the X-ray intensities of each standard sample shown in Table 5 and the matrix correction coefficients shown in Table 3 to acquire the calibration curve equation of Math. 2 with the constants "a", "b", and "c" specified or the calibration curve equation of Math. 3 with the constants "b" and "c" specified. In this case, the content calculation module 136 calculates the content based on the calibration curve equation (Math. 2 or Math. 3).

In addition, included in Math. 1 to Math. 3 is expressed as the analysis component, but the analysis component may be a single element, or may be an oxide (for example, $SiO_2$) or another compound. For example, when the analysis component is a compound such as $SiO_2$, the content of $SiO_2$ is used as $W_i$ included in Math. 1 to Math. 3. In this case, the analysis line for which the intensity is to be measured is fluorescent X-rays ascribable to the element Si.

Further, the description has been given above of the case where the thickness acquired in Step S205 and the thickness of the unknown sample are the same, but the present invention is not limited thereto. Specifically, as described above, when the thickness of the unknown sample is smaller than the thickness from the front surface to the position at which the detection intensity becomes 0, the predetermined position set in Step S206 is the position of a back surface of the unknown sample. In this case, the thickness acquired in Step S205 and the thickness of the unknown sample are the same. Meanwhile, when the thickness of the unknown sample is larger than the thickness from the front surface to the position at which the detection intensity becomes 0, the predetermined position set in Step S206 is the position at which the detection intensity becomes 0. In this case, the thickness of the unknown sample may be larger than the thickness acquired in Step S205.

The detection intensity calculation module 124 may also calculate the detection intensity with the geometry effect taken into consideration through use of a Monte Carlo simulation instead of the processing steps of from Step S206 to Step S208. Specifically, first, the thickness of the virtual sample, the intensity of the primary X-rays to be applied to each position on the front surface of the virtual sample, and an incident angle are set as parameters. Each of the parameters is appropriately set based on the thickness of the unknown sample, specifications of the X-ray source 106, and specifications of the detector 112.

Subsequently, a generation position of the primary X-rays on an X-ray tube target, a direction in which the primary X-rays are emitted, and the energy of the primary X-rays, are determined based on randomly determined values. An optical path of the primary X-rays to the front surface of the virtual sample is determined based on the generation position and the direction. In addition, the depth at which the primary X-rays penetrate into the virtual sample is determined based on the energy.

A part of the fluorescent X-rays generated inside the virtual sample irradiated with the primary X-rays is emitted to the outside of the virtual sample, and detected by a virtual detector 112 set at a given position. The detection intensity of the detected fluorescent X-rays can be theoretically calculated through use of the FP method by using the Monte Carlo simulation in which the optical path and penetration depth of the above-mentioned primary X-rays are randomly determined values. The matrix correction coefficient may be calculated through use of the detection intensity calculated by this method.

Further, in Step S208, the detection intensity calculation module 124 may calculate the detection intensity based on an X-ray intensity theoretical equation (Math. 10) including: $K_i$ which is a constant; $W_i$ representing the mass fraction of a measurement component "i" which is one component of a plurality of analysis components; ρ representing the density of the representative sample and the plurality of comparative samples; "d" representing the thickness of the representative sample and the plurality of comparative samples; f(x) representing the detection ratio; $\mu_j$ representing an overall absorption coefficient for the coexisting component "j" with respect to the analysis lines, the coexisting component "j" being a component other than the measurement component "i" among the analysis components; $W_j$ representing the mass fraction of the coexisting component "j", and "x" representing the position from the front surface of the sample.

$$I_{Ti} = K_i W_i \rho \sim_0^d f(x) e^{-(\Sigma \mu_j W_j) \rho x} dx \qquad [\text{Math. 10}]$$

Math. 10 is a mathematical expression converted from Math. 4 used in the related art in consideration of the geometry effect. The detection intensity calculation module 124 may calculate the detection intensity by analytically calculating Math. 10. In the above-mentioned embodiment, the detection intensity calculation module 124 divides a thickness of the sample from the front surface of the sample to the back surface with fixed intervals, and calculates the intensity of the fluorescent X-rays for each of the divisions, to thereby calculate the total sum of the calculate intensities of the fluorescent X-rays. A method for this calculation is a method of calculating the detection intensity by approximating the total sum as a value obtained by the X-ray intensity theoretical equation expressed by Math. 10.

Further, this embodiment may be applied to a method of performing an analysis by a calibration curve method through use of a ratio between a fluorescent X-ray intensity and an intensity of scattered X-rays, for example, Compton scattered X-rays. In this case as well, in regard to the intensities of both the fluorescent X-rays and the scattered rays, the theoretical intensities may be calculated in consideration of the geometry effect, and the matrix correction coefficients may be calculated in the same manner as described above.

Further, the X-ray fluorescence spectrometer 100 according to this embodiment may be any one of the energy-dispersive X-ray fluorescence spectrometer or the wavelength-dispersive X-ray fluorescence spectrometer.

As described above, even when the geometry effect appears noticeably, it is possible to create a calibration curve for which the influence of the geometry effect has been corrected, and to calculate the content with high accuracy.

REFERENCE SIGNS LIST

100 X-ray fluorescence spectrometer, 102 measuring unit, 104 control unit, 106 X-ray source, 108 sample stage, 110 X-ray filter, 112 detector, 114 counter, 116 sample, 118 representative composition acquisition module, 120 comparative composition acquisition module, 122 thickness acquisition module, 124 detection intensity calculation module, 126 emission intensity calculation module, 128 detection ratio acquisition module, 130 calculation module, 132 matrix correction coefficient calculation module, 134 calibration curve creation module, 136 content calculation module, 702 detection region, 704 non-detection region

The invention claimed is:

1. A quantitative analysis method, comprising:
a representative composition acquisition step of acquiring a representative composition, which is a composition expressed by contents of analysis components contained in an unknown sample to be analyzed, and is set to represent the contents of the analysis components;
a comparative composition acquisition step of acquiring a plurality of comparative compositions, in each of which the content of one of the analysis components contained in the representative composition is changed by a predetermined content;
a detection intensity calculation step of, assuming that a virtual sample having a thickness set in advance and being indicated by each of the representative composition and the comparative compositions has been irradiated with primary X-rays, calculating a detection intensity indicating an intensity of fluorescent X-rays detected under an influence of a geometry effect through use of a fundamental parameter method; and
a matrix correction coefficient calculation step of calculating a matrix correction coefficient $\alpha_j$ for each of the analysis components through use of a calibration curve equation expressed by:

$$W_i = (bI_i + c)(1 + \Sigma \alpha_j W_j) \qquad [\text{Math. 1}]$$

$$W_i = (aI_i^2 + bI_i + c)(1 + \Sigma \alpha_j W_j); \text{ or} \qquad [\text{Math. 2}]$$

$$W_i = bI_i(1 + \Sigma \alpha_j W_j) + c, \text{ where:} \qquad [\text{Math. 3}]$$

$W_i$ represents a mass fraction of one component "i" included in the analysis components;
"a", "b", and "c" each represent a constant;
$I_i$ represents the detection intensity calculated for the component "i" in the detection intensity calculation step;
$\alpha_j$ represents the matrix correction coefficient for the component "i" with respect to a coexisting component "j"; and
$W_j$ represents a mass fraction of the coexisting component "j",
wherein the thickness set in advance as the thickness of the virtual sample, and a thickness of the unknown sample, are the same.

2. The quantitative analysis method according to claim 1, wherein the detection intensity calculation step includes:
a division step of dividing a thickness of the virtual sample from the front surface of the virtual sample to a predetermined position with fixed intervals; and
a total sum calculation step of calculating a total sum of the detection intensity calculated for each of the divisions.

3. The quantitative analysis method according to claim 2, wherein the predetermined position is set to:
a position at which the detection intensity becomes 0 when a thickness of the unknown sample is larger than a thickness from the front surface to the position at which the detection intensity becomes 0; and
a position of a back surface of the unknown sample when the thickness of the unknown sample is smaller than the thickness from the front surface to the position at which the detection intensity becomes 0.

4. The quantitative analysis method according to claim 1, wherein the detection intensity calculation step includes:
an emission intensity calculation step of, assuming that the virtual sample indicated by each of the representative composition and the comparative compositions has been irradiated with primary X-rays, calculating an emission intensity indicating the intensity of the fluorescent X-rays emitted from each of the analysis components, as a function of a position from the front surface of the virtual sample with the geometry effect being ignored;

a detection ratio acquisition step of acquiring, assuming that a virtual sample indicated by a given composition has been irradiated with primary X-rays, a detection ratio as the function of the position from the front surface, the detection ratio representing a ratio between an emission intensity indicating the intensity of the fluorescent X-rays emitted from the virtual sample and the detection intensity of the fluorescent X-rays detected under the influence of the geometry effect for the lines of emitted fluorescent X-rays; and a multiplication step of multiplying the emission intensity by the detection ratio to calculate the detection intensity as the function of the position from the front surface.

5. The quantitative analysis method according to claim 1, further comprising:

a standard sample measuring step of irradiating a plurality of standard samples containing the analysis components and having known contents with primary X-rays, and measuring the intensity of the fluorescent X-rays emitted from each of the analysis components;

a calibration curve creation step of creating a calibration curve expressed by the calibration curve equation for each of the analysis components, based on the intensity of the fluorescent X-rays measured in the standard sample measuring step and the matrix correction coefficient;

an unknown sample measuring step of irradiating the unknown sample with primary X-rays, and measuring the intensity of the fluorescent X-rays for each of the analysis components; and a content calculation step of calculating the content of each of the analysis components contained in the unknown sample, based on the intensity of the fluorescent X-rays measured in the unknown sample measuring step and the calibration curve, wherein all the thicknesses of the plurality of standard samples are the same as the thickness set in advance as the thickness of the virtual sample and the thickness of the unknown sample.

6. The quantitative analysis method according to claim 1, wherein the detection intensity calculation step is a step of calculating the detection intensity through use of a Monte Carlo simulation, and wherein the detection intensity calculation step includes the steps of:

setting, as parameters, a thickness of the virtual sample, the intensity of the primary X-rays to be applied to each position on the front surface of the virtual sample, and an incident angle with respect to the front surface of the primary X-rays;

determining, based on randomly determined values, a generation position of the primary X-rays on an X-ray tube target, a direction in which the primary X-rays are emitted, and energy of the primary X-rays; and calculating the intensity of the fluorescent X-rays for a predetermined position using the detection intensity for each trajectory from the generation position of the primary X-rays to the front surface.

7. A non-transitory computer-readable information storage medium for storing a program for causing a computer used for an X-ray fluorescence spectrometer to execute:

a representative composition acquisition step of acquiring a representative composition, which is a composition expressed by contents of analysis components contained in an unknown sample to be analyzed, and which is set to represent the contents of the analysis components;

a comparative composition acquisition step of acquiring a plurality of comparative compositions, in each of which the content of one of the analysis components contained in the representative composition is changed by a predetermined content;

a detection intensity calculation step of, assuming that a virtual sample having a thickness set in advance and being indicated by each of the representative composition and the comparative compositions has been irradiated with primary X-rays, calculating a detection intensity indicating an intensity of fluorescent X-rays detected under the influence of a geometry effect through use of a fundamental parameter method; and a matrix correction coefficient calculation step of calculating a matrix correction coefficient $\alpha_j$ for each of the analysis components through use of a calibration curve equation expressed by:

$$W_i = (bI_i + c)(1 + \Sigma \alpha_j W_j);  \qquad \text{[Math. 1]}$$

$$W_i = (aI_i^2 + bI_i + c)(1 + \Sigma \alpha_j W_j); \text{ or}$$

$$W_i = bI_i(1 + \Sigma \alpha_j W_j) + c, \text{ where:} \qquad \text{[Math. 3]}$$

$W_i$ represents a mass fraction of one component "i" included in the analysis components;

"a", "b", and "c" each represent a constant;

$I_i$ represents the detection intensity calculated for the component "i" in the detection intensity calculation step;

$\alpha_j$ represents the matrix correction coefficient for the component "i" with respect to a coexisting component "j"; and $W_j$ represents a mass fraction of the coexisting component "j", wherein the thickness set in advance as the thickness of the virtual sample, and a thickness of the unknown sample, are the same.

8. An X-ray fluorescence spectrometer, comprising:

a representative composition acquisition module configured to acquire a representative composition, which is a composition expressed by contents of analysis components contained in an unknown sample to be analyzed, and which is set to represent the contents of the analysis components;

a comparative composition acquisition module configured to acquire a plurality of comparative compositions, in each of which the content of one of the analysis components contained in the representative composition is changed by a predetermined content;

a detection intensity calculation module configured to, assuming that a virtual sample having a thickness set in advance and being indicated by each of the representative composition and the comparative compositions has been irradiated with primary X-rays, calculate a detection intensity indicating an intensity of fluorescent X-rays detected under the influence of a geometry effect through use of a fundamental parameter method; and a matrix correction coefficient calculation module configured to calculate a matrix correction coefficient $\alpha_j$ for each of the analysis components through use of a calibration curve equation expressed by:

$$W_i = (bI_i + c)(1 + \Sigma \alpha_j W_j); \qquad [\text{Math. 1}]$$

$$W_i = (aI_i^2 + bI_i + c)(1 + \Sigma \alpha_j W_j); \text{ or} \qquad [\text{Math. 2}]$$

$$W_i = bI_1(1 + \Sigma \alpha_j W_j) + c, \text{ where:} \qquad [\text{Math. 3}]$$

$W_i$ represents a mass fraction of one component "i" included in the analysis components;

"a", "b", and "c" each represent a constant;

$I_i$ represents the detection intensity calculated for the component "i" by the detection intensity calculation module;

$\alpha_j$ represents the matrix correction coefficient for the component "i" with respect to a coexisting component "j"; and $W_j$ represents a mass fraction of the coexisting component "j", wherein the thickness set in advance as the thickness of the virtual sample, and a thickness of the unknown sample, are the same.

\* \* \* \* \*